(12) United States Patent
Berg et al.

(10) Patent No.: US 9,898,690 B2
(45) Date of Patent: Feb. 20, 2018

(54) GESTURE CONTROL FOR PRINTING PRESSES (71) Applicant: HEIDELBERGER DRUCKMASCHINEN AG, Heidelberg (DE)

(72) Inventors: Winfried Berg, Heidelberg (DE); Dieter Hauck, Eberbach (DE); Edelbert Koenig, Kronau (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 289 days.

(21) Appl. No.: 14/087,617

(22) Filed: Nov. 22, 2013

(65) Prior Publication Data

US 2014/0146360 A1 May 29, 2014

(30) Foreign Application Priority Data

Nov. 23, 2012 (DE) .......................... 10 2012 022 882

(51) Int. Cl.
*G06F 3/12* (2006.01)
*G06K 15/00* (2006.01)
*G06F 3/01* (2006.01)
*B41F 33/00* (2006.01)
*G06F 3/03* (2006.01)

(52) U.S. Cl.
CPC ........ *G06K 15/005* (2013.01); *B41F 33/0009* (2013.01); *B41F 33/0036* (2013.01); *G06F 3/013* (2013.01); *G06F 3/017* (2013.01); *G06F 3/0304* (2013.01)

(58) Field of Classification Search
None
See application file for complete search history.

(56) References Cited

U.S. PATENT DOCUMENTS

| 5,511,148 | A | 4/1996 | Wellner | |
|---|---|---|---|---|
| 7,663,771 | B2 | 2/2010 | Czotscher et al. | |
| 7,876,441 | B2 | 1/2011 | Fejfar | |
| 2002/0135628 | A1* | 9/2002 | Kolodziej | B41J 29/393 347/19 |
| 2005/0168700 | A1* | 8/2005 | Berg | B41F 33/0036 353/34 |

(Continued)

FOREIGN PATENT DOCUMENTS

| DE | 19918072 A1 | 6/2000 |
|---|---|---|
| DE | 69430967 T2 | 11/2002 |

(Continued)

OTHER PUBLICATIONS

German Patent and Trademark Office Search Report dated Jul. 4, 2013.

*Primary Examiner* — John Wallace
(74) *Attorney, Agent, or Firm* — Laurence A. Greenberg; Werner H. Stemer; Ralph E. Locher (57) ABSTRACT

A device controls at least one of a machine, a color measurement device or an inspection system of the graphic arts industry. The device contains a control console that has at least one screen for displaying at least one of machine information, color information or image information. The control console includes a plurality of sensors for detecting gestures of an operator who operates the machine, the color measurement device or the inspection system via the control console.

7 Claims, 5 Drawing Sheets

(56) References Cited

U.S. PATENT DOCUMENTS

| | | | |
|---|---|---|---|
| 2006/0007469 A1* | 1/2006 | Uruma | H04N 1/0035 358/1.14 |
| 2006/0107860 A1 | 5/2006 | Dilling | |
| 2007/0272106 A1* | 11/2007 | Hauck | B41F 33/0036 101/484 |
| 2012/0033242 A1 | 2/2012 | Naegele et al. | |
| 2012/0105324 A1* | 5/2012 | Lee | G06F 3/005 345/157 |
| 2012/0250072 A1* | 10/2012 | Miller | G06F 3/1205 358/1.15 |
| 2012/0280072 A1* | 11/2012 | Lin | B65H 57/00 242/157 R |
| 2013/0044080 A1* | 2/2013 | Chiang | G06F 3/017 345/174 |
| 2013/0082947 A1* | 4/2013 | Chang | G06F 1/1643 345/173 |

FOREIGN PATENT DOCUMENTS

| | | |
|---|---|---|
| DE | 20216904 U1 | 1/2003 |
| DE | 10317064 A1 | 7/2004 |
| DE | 102004053738 A1 | 5/2006 |
| DE | 102006013173 A1 | 10/2006 |
| DE | 102007058708 A1 | 6/2008 |
| DE | 102011017305 A1 | 10/2012 |
| DE | 102011075343 A1 | 11/2012 |
| EP | 1889721 A2 | 2/2008 |
| EP | 2415605 A1 | 2/2012 |
| WO | 2010078996 A1 | 7/2010 |

* cited by examiner

GESTURE CONTROL FOR PRINTING PRESSES

CROSS-REFERENCE TO RELATED APPLICATION

This application claims the priority, under 35 U.S.C. § 119, of German application DE 10 2012 022 882.1, filed Nov. 23, 2012; the prior application is herewith incorporated by reference in its entirety.

BACKGROUND OF THE INVENTION

Field of the Invention

The present invention relates to a device for controlling a machine and/or a color measurement device and/or an inspection system in the graphic arts industry, containing a control console with at least one screen for displaying machine information and/or color information and/or image information.

Modern printing presses include a plurality of components that can be adjusted either by an operator using the control unit of the machine or automatically by the control unit of the machine. In both cases the current settings of the machine need to be reported back to the operator. In general, screens are provided for this purpose, i.e. for displaying the information to the operator. However, other ways of reporting the status of the machine to the operator are known in the art. Published, non-prosecuted German patent application DE 10 2007 058 708 A1, for example, discloses to report information in an acoustic or haptic way in addition to displaying information in a visual way on the screen. The document describes an integrated scheme of operation for printing presses that include at least one computer, an operating device, an input device, and an output device. The machine computer processes at least two signals of the group of acoustic, haptic, or optical information. This means that the operator has at least two ways of receiving information. It is likewise possible for the operator to issue control commands using either a keyboard or a microphone for voice control, for example. In addition, a camera is provided for recognizing gestures of the operator, i.e. for recording hand movements of the operator and subsequently translating them into corresponding control commands for the machine.

International patent disclosure WO 2010/078996 A2 likewise discloses an apparatus including an input device for inputting control commands. A sensor is provided to recognize movements and thus gestures without having to touch the input device. The sensor may operate electrostatically or capacitively. Alternatively, a camera may be provided for image recognition purposes, i.e. to carry out image recognition of the operator's hand and identify gestures.

SUMMARY OF THE INVENTION

An object of the present invention is to propose a device for providing gesture control for practical, everyday purposes for a machine and/or a color measurement device and/or an inspection system in the graphic arts industry.

In accordance with the invention, the aforementioned object is attained by the first claim. Advantageous embodiments of the invention become apparent from the dependent claims and the drawings. In accordance with the present invention, a provision is made for the control console to include a plurality of sensors for recognizing gestures of an operator who operates the machine and/or the color measurement device and/or the inspection system using the control console. It is the provision of multiple sensors that makes gesture control work in practice since the operator of a graphic arts machine such as a printing press assumes different positions in front of the control console, requiring the gestures to be recorded from different angles. A single sensor cannot do this, which means that a plurality of sensors needs to be provided to be able to reliably recognize gestures made by an operator in front of the control console even when the operator walks back and forth or turns around.

In accordance with a first embodiment of the invention, the control console contains at least one screen, a support provided to receive a sheet-shaped printing material and arranged underneath the screen, and at least one sensor arranged to recognize gestures made by the operator with his fingers on the surface of a printing material resting on the support. A control console of a printing press generally contains what may be referred to as a sheet support on which a printed printing material may be deposited. An operator may use such a sheet support to inspect the quality of the print on the produced printing material either visually or by a color measurement device. For this purpose, the sheet support is advantageously arranged underneath the screen on which the desired image or original may be displayed. So the operator is able to examine the original on the screen and the printed result on the printing material resting on the sheet support directly next to each other to detect deviations between the original on the screen and the printed product resting on the sheet support without difficulty. When the operator detects deviations between the printed product and the original displayed on the screen, he will want to make adjustments to minimize them. For this purpose, more or less ink needs to be metered out in accordance with locations in ink zones that are overinked or underinked. This is particularly easy to achieve if the operator only needs to point to the location on the printed product that needs more or less ink. To ensure that this pointing to the printed product is reliably recognized, a sensor may advantageously be arranged in a way for it to be capable of recognizing gestures of the operator even when the operator makes these gestures by pointing a finger at the surface of the printing material resting on the support. For this purpose the sensor needs to be adapted to be able to recognize an operator's fingers on or slightly above the printing material even when the operator bends forward, for example, covering a sensor that is arranged directly above the operator. Consequently at least one sensor is preferably to be provided slightly above the sheet support in the lower region of the control console to be able to reliably recognize an operator's gestures on the surface of the printing material.

In accordance with a further embodiment of the present invention a provision is made for the sensors to be cameras and for the control console to include a computer for evaluating the pictures recorded by the cameras and for evaluating these pictures in such a way that the operator's eye movements are detected and factored in when displaying machine information and/or color information and/or image information on the screen. The screen on the control console of the machine may be embodied as a large screen of a 52-inches or larger diagonal to allow the operator to see the displayed information even from greater distances and to be able to display an original in its original size. Then the operator may keep in view not only the image displayed on the screen, but also the operating elements on the control console or parts of the machine. In this context, it is advantageous for the large screen to display information that corresponds to the operating elements or part of the printing press that the operator has directed his eyes to. For it is to be expected that the operator points his eyes to those operating elements or that part of the press that are/is to be actuated or are/is of interest. For this purpose, what is known as eye tracking may be carried out to display precisely the information on the screen that corresponds to an operator's range of vision. For this purpose, an operator's eye movements are tracked by the camera and are then evaluated in a suitable way in the computer of the control console. Then the information corresponding to the operator's field of vision is displayed on the screen.

In accordance with a further embodiment of the invention a provision is made for the control console to have roofing and for sensors to be arranged on the left and/or right side of the roofing. The control console of a printing press generally has a roofing to be able to mount a color inspection light. The color inspection light to provide standardized illumination for the accurate evaluation of the colors of a printed product resting on the sheet support. As the representation of colors is a function of the illumination, the sheet needs to be illuminated correctly during quality control. The roofing further acts to keep out ambient light, eliminating external light sources that would falsify the colors at least from above. The right and/or left sides of the roofing may advantageously be used to mount sensors, in particular cameras, for recognizing control gestures. In this case, no additional mounting devices need to be created to be able to mount the sensors. As the roofing usually extends over the major part of the control console, there is a simple way of mounting sensors. The sensors may be arranged on the left or right side of the roofing to be capable of sensing the entire control console.

In accordance with an advantageous further feature, a provision is made for the device to be capable of simultaneously recognizing gestures of multiple operators. For example, one operator may make adjustments on the printing press while another operator is examining a supported sheet with corresponding color information being displayed on the screen. To be able to distinguish between the gestures of multiple operators, suitable image processing of the gestures must be implemented in a way to ensure that for example the hands of multiple operators are clearly identified. This may be done based on the different hand sizes or other visual features. Based on the pictures provided by the sensors, the control computer may then associate the gestures with the various operators and correspondingly display information on the screen for one operator or another. This provides a convenient way for multiple operators to operate a machine.

In accordance with a further feature, a provision is made for the roofing to include a color inspection light and for at least one sensor to be integrated into the color inspection light. The integration of the sensor into the color inspection light advantageously allows the sensor and the color inspection light to be mounted as one constructional unit. Thus only one electrical connection is required and it is possible to use straightforward wiring. In addition, the integration of the sensors provides an optically unobtrusive way of arranging the sensors.

In accordance with a further embodiment of the invention, a provision is made for the control console to include a plurality of screens. In this case, it is possible to control multiple screens of the machine and/or of the color measurement device and/or of the inspection system by gestures. The operator may in particular use gesture control to select which content to be displayed on which screen. On a large screen on the rear wall of the control console, for example, the operator may have information displayed whereas operating elements may be displayed on a second, smaller screen embodied as a touchscreen.

In accordance with an advantageous further feature, a provision is made for transmitting the content of at least one screen to at least one further screen based on the recognition of gestures made by an operator. In particular if a large screen and a small touchscreen are provided, the operators may use gesture control additionally to transfer information that is displayed on the touchscreen to the large screen. Such a transfer of content from at least one screen to another screen may be initiated by what is known as a swiping gesture in the direction of the respective other screen, for example.

In accordance with a particularly advantageous embodiment of the present invention provision is made for a screen template that is to be transmitted to at least two further screens to be selectable on a screen by a gesture. In this case the operator may have the content of a screen displayed not only on one further screen but also on multiple screens. For this purpose, he initially selects the appropriate screen template on a screen, then makes a gesture to select the screens on which to display the template, and makes another gesture, in particular a swiping gesture, to transmit the selected screen template to the further screens. Alternatively, it is possible for the operator to select different templates for different screens and to transmit a different template to each screen by a swiping gesture. This is a way for the operator to be flexible in his decision on which image content is to be displayed on which screen.

In accordance with a further embodiment of the invention, a provision is made for the control console to include a color measurement device for examining a sheet-shaped printing material that rests on a sheet support and for the color measurement device to be controllable by the gesture recognition sensors. In this case, the operator may control the color measurement device on the control console by gestures in addition to the operating elements of the printing press. This is a particularly convenient way of operating the color measurement device in a consistent operating scheme involving gesture control.

Other features which are considered as characteristic for the invention are set forth in the appended claims.

Although the invention is illustrated and described herein as embodied in a gesture control for printing presses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
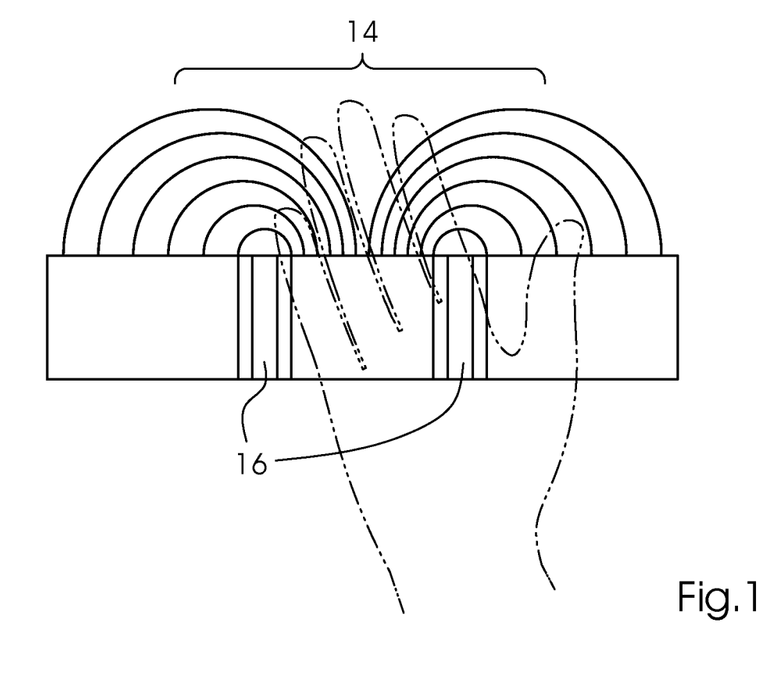
FIG. 1 is an illustration of hand gesture recognition using capacitive sensors according to the invention.

Referring now to the figures of the drawings in detail and first, particularly to FIG. 1 thereof, there is shown a sensor system for detecting hand gestures using capacitive sensors 16 and an electrical field 14. The sensors 16 register changes in the electrical field 14 that result from manual gestures as the fingers modify the field strength in a way corresponding to their shape and motion. A gesture that has been recognized by the sensors 16 is evaluated and translated into a control command by an operating computer 7 that is connected to the device.

Figure 2:
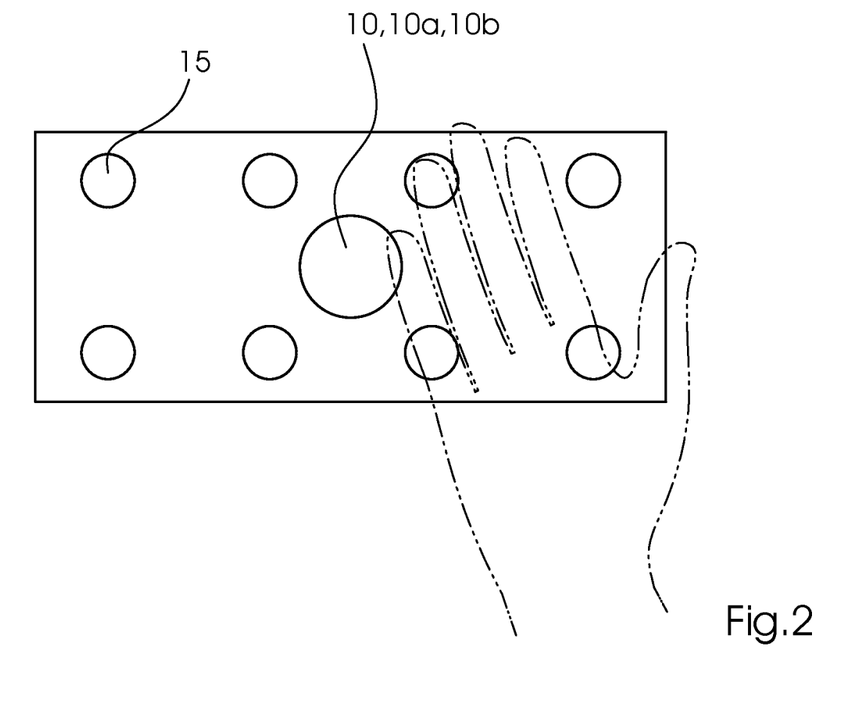
FIG. 2 is an illustration of hand gesture recognition using one or more infrared LEDs.

FIG. 2 illustrates an optical sensor system for registering gestures by one or more infrared LEDs 15 and one or more cameras 10, 10a, 10b. The camera(s) 10, 10a, 10b are used to register the reflections and/or shadows created by the moving hand. These reflections/shadows are then evaluated and translated into control commands by the operating computer 7 that is connected to the device.

Figure 3:
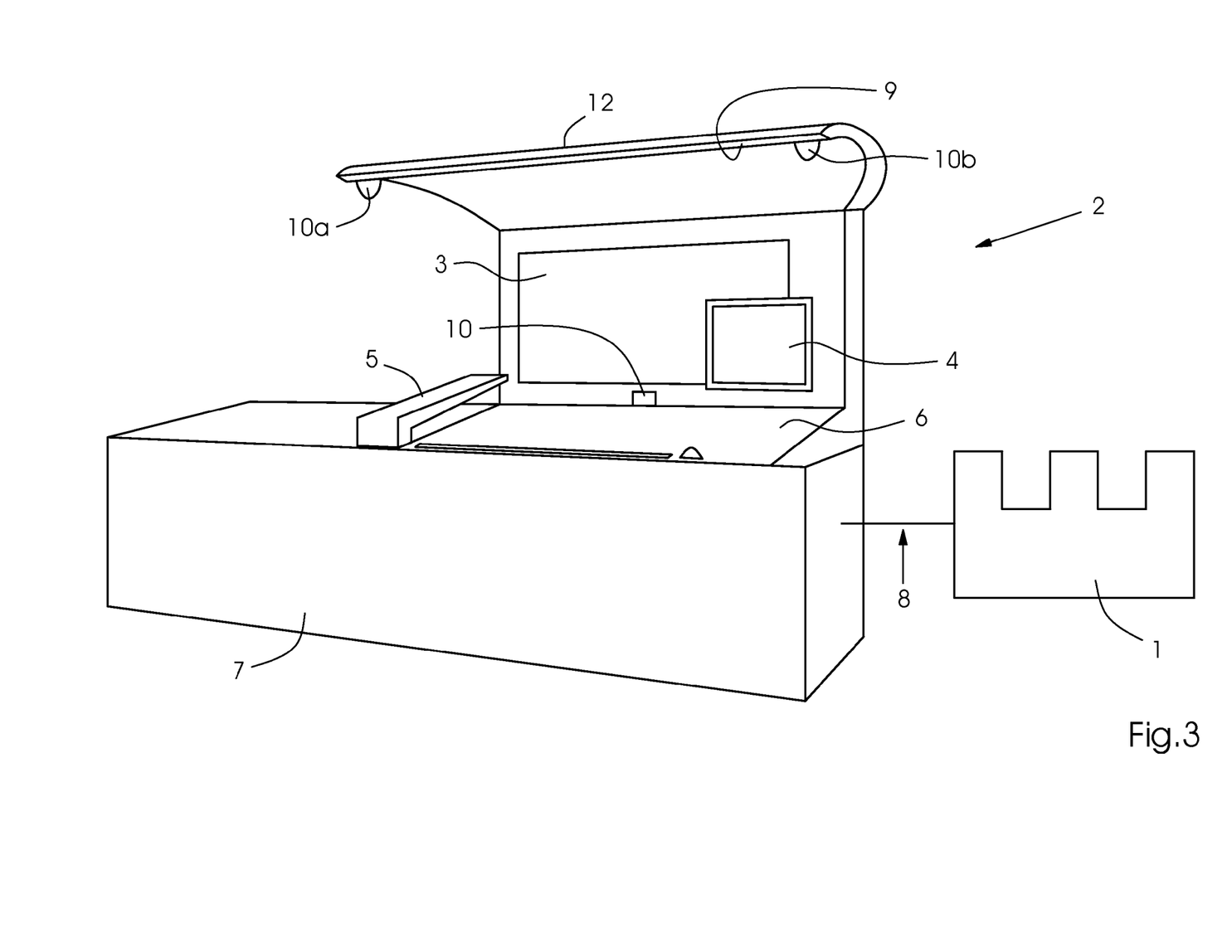
FIG. 3 is a diagrammatic, perspective view of a printing press control console including a large screen, a touchscreen, a color measurement device, and gesture control device according to the invention.

A control console 2 shown in FIG. 3 is used to control a printing press 1 connected thereto by a communication link 8. For this purpose, the control console 2 includes the operating computer 7 for processing the operating staff's control commands and for providing information on the operating condition of the printing press 1 to the operating staff. The operating computer 7 is located in a housing in a lower region of the control console 2. The operating computer 7 may display information about the machine condition on a large screen 3 on rear wall of the control console 2 or on a touchscreen 4. In addition, the operating computer 7 may receive control commands via the touchscreen 4 or via gesture recognition by the cameras 10, 10a, 10b. In order for the gesture recognition to work even when the operating staff turns away from the control console 2 or bends over the lower portion of the control console 2, a plurality of cameras 10a, 10b, 10 is provided. The cameras 10a, 10b are arranged on a roofing 12 in an upper region of the control console 2. The arrangement on the left and right sides causes the operators' gestures to be registered from at least two angles of vision. In addition, a light source 9 acting as a color inspection light to ensure standardized illumination of the control console 2 is arranged on the roofing 12. The light source 9 may thus provide standardized illumination for a sheet-shaped printing material resting on a sheet support 6 in order for the operator to examine the quality of the printed product resting on the support 6. In addition, the printed product resting on the sheet support 6 may be evaluated by a color measurement device 5. In this way objective control of the quality of the colors is possible.

The lower camera 10 is mainly used to register gestures an operator makes with his fingers on the surface of a printing material on the sheet support 6. This is in particular the case when the operator wants to modify the color, pointing at regions on the printing material on the sheet support 6 where the color is to be modified. When the operator bends over the sheet support 6 in the process, the cameras 10, 10b may be unable to register this area. However, camera 10 is arranged low enough to be able to detect an operator's gestures even when he bends over the sheet support 6.

In principle, the operator may control all functions of the press 1 by gestures. In addition, gesture control may be used to control a video conference on the large screen 3, for example. Moreover, the operator may make a suitable gesture to start a magnifying function on the screens 3, 4 to have some regions displayed on a larger or smaller scale. The operator may in particular select certain areas by gestures, initiating specific processes by the selection, for example measuring the printing material or controlling the sheet length, and may cause a turning of the printing material on the sheet support 6 to be recognized by the control. Gesture control may also be used to identify different operators, for example by optically scanning their hands and associating them with a respective operator. In addition, it is possible to implement face recognition, in particular eye recognition to achieve identification. To be able to display pertinent information in particular on the large screen 3 at all times, what is known as an eye tracking function is provided, which detects the position of the operator's eyes and, together with the operating computer 7, is capable of displaying the information that corresponds to the operator's angle of vision on the large screen 3.

Figure 4:
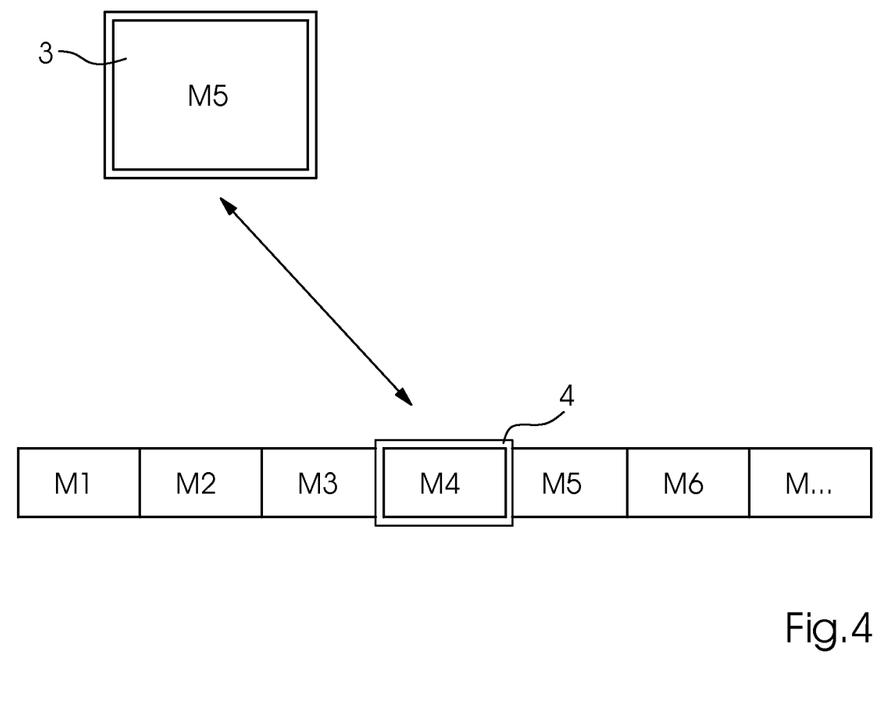
FIG. 4 is an illustration of a transmission of a selected screen template from the touchscreen to the large screen.

The lower region of FIG. 4 illustrates the touchscreen 4, which may display a plurality of templates of user interfaces M. The templates are consecutively numbered in FIG. 4. The operator now has the option of transmitting operating template M4 selected on the touchscreen to the large screen 3, causing it to replace the template M5 currently displayed thereon, for example by a swiping gesture. In this way, it is easy for the operator to transmit the screen content of the touchscreen 4 to the large screen 3 and vice versa. The direction of transmission is defined by the direction of the swiping gesture.

Figure 5:
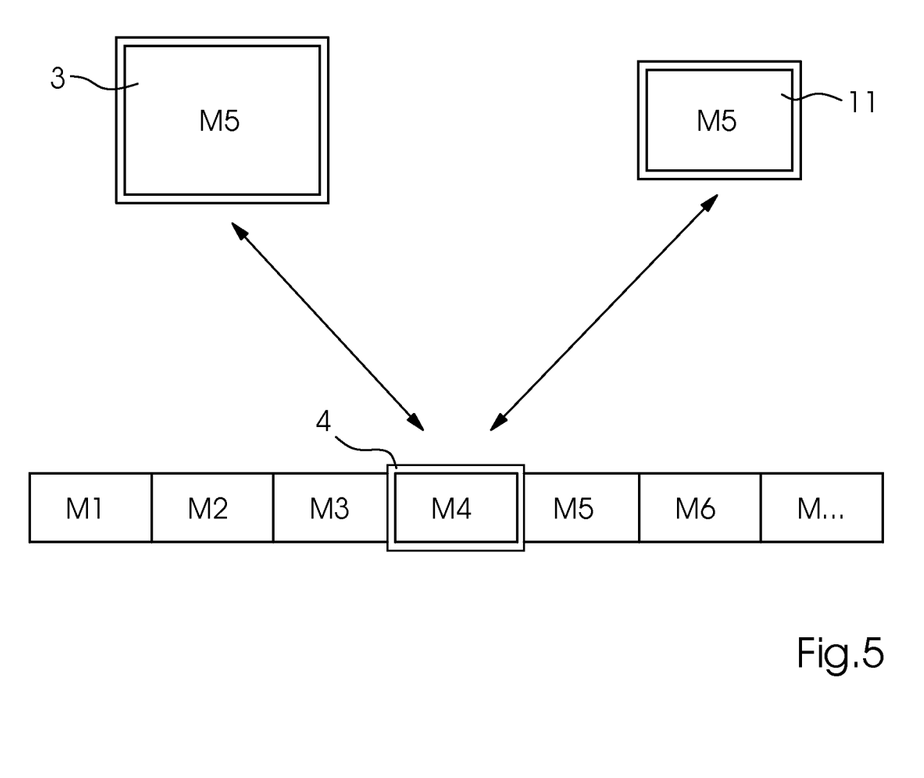
FIG. 5 is an illustration of the transmission of a selected screen template from the touchscreen to the large screen and a further screen.

The embodiment shown in FIG. 5 includes a further screen 11, to which it is likewise possible to transmit templates of a user interface M. In this embodiment, the operator has the option of making a swiping gesture simultaneously to transmit template M4 from the touchscreen 4 to the large screen 3 and to the further screen 11, replacing the template M5 currently displayed thereon. It is to be understood that it is likewise possible to select different templates for screens 3, 11 and to transmit them separately. This is done by a gesture similar to that of FIG. 2. If the screen content from touchscreen 4 is to be sent to a plurality of screens 3, 11 this is done by a specific gesture explicitly for transmitting an identical screen content from the touchscreen 4 to a plurality of screens 3, 11.

The invention claimed is:

1. A device for controlling at least one of a machine, a color measurement device or an inspection system in a graphic arts industry, the device comprising:
   a control console having a plurality of screen devices for displaying at least one of machine information, color information, or image information, said control console further having a plurality of sensors for recognizing gestures of an operator who operates at least one of the machine, the color measurement device or the inspection system via said control console, said control console further having a roofing and said sensors being mounted on a left-side of said roofing and on a right side of said roofing and having different fields of view, a content of at least one of said screen devices being transmitted to at least one further one of said screen devices by registered gestures of operating staff; and a color inspection light providing standardized illumination disposed in said roofing and at least one of said sensors is integrated into said color inspection light.

2. The device according to claim 1, wherein said control console contains a support for receiving a sheet-shaped printing material, said support disposed underneath said plurality of screen devices, and at least one of said sensors is disposed such that said sensor is capable of recognizing gestures the operator makes with his fingers on a surface of the sheet-shaped printing material that rests on said support.

3. The device according to claim 1, wherein:
said sensors are cameras; and
said control console further has a computer that evaluates pictures taken by said cameras and evaluates the pictures such that eye movements of the operator are registered and are factored in when displaying the machine information, the color information or the image information on said screen devices.

4. The device according to claim 1, wherein the device is capable of simultaneously recognizing the gestures of multiple operators.

5. The device according to claim 1, wherein said control console has a screen template selectable by gesture on at least one of said screen devices, said screen template being transmittable to at least two further ones of said screen devices.

6. The device according to claim 1,
further comprising at least one infrared LED mounted to said control console; and
wherein said computer evaluates reflections and shadows of said infrared LED as detected by said cameras and evaluates the reflections and shadows such that movements of a hand of the operator are detected and factored in when displaying the machine information, the color information or the image information on said screen.

7. The device according to claim 1, wherein said sensors further include capacitive sensors and said computer evaluates changes in an electrical field measured by said capacitive sensors and evaluates the changes such that movements of a hand of the operator are detected and factored in when displaying the machine information, the color information or the image information on said screen.

* * * * *